US011277738B2

(12) United States Patent
Namiranian

(10) Patent No.: US 11,277,738 B2
(45) Date of Patent: Mar. 15, 2022

(54) MNO-SPECIFIC 5G FUNCTIONALITY DELIVERY WITH ESIM STORED ENCRYPTION KEYS IN USER DEVICE

(71) Applicant: T-Mobile USA, Inc., Bellevue, WA (US)

(72) Inventor: Babak Namiranian, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 459 days.

(21) Appl. No.: 16/352,582

(22) Filed: Mar. 13, 2019

(65) Prior Publication Data
US 2020/0008049 A1 Jan. 2, 2020

Related U.S. Application Data
(60) Provisional application No. 62/692,610, filed on Jun. 29, 2018.

(51) Int. Cl.
*H04W 12/03* (2021.01)
*H04W 8/26* (2009.01)
(Continued)

(52) U.S. Cl.
CPC .............. *H04W 12/03* (2021.01); *H04W 4/12* (2013.01); *H04W 8/183* (2013.01); *H04W 8/26* (2013.01);
(Continued)

(58) Field of Classification Search
CPC . H04W 12/03; H04W 12/04; H04W 12/0431; H04W 12/0433; H04W 12/06;
(Continued)

(56) References Cited

U.S. PATENT DOCUMENTS

2014/0140507 A1 5/2014 Park et al.
2016/0021529 A1 1/2016 Park et al.
(Continued)

FOREIGN PATENT DOCUMENTS

WO 2018008972 A1 1/2018

OTHER PUBLICATIONS

International Application No. PCT/US2019/039960, International Search Report and Written Opinion dated Oct. 23, 2019, 12 pages.

*Primary Examiner* — Philip Sobutka
(74) *Attorney, Agent, or Firm* — Han Santos, PLLC

(57) ABSTRACT

Mobile network operator (MNO)-specific 5G functionality information may be distributed by an MNO to a user device. A request from a mobile network operator (MNO) to provide MNO-specific 5G functionality information of the MNO to a user device may be received. In turn, a messaging service may be directed to deliver the MNO-specific 5G functionality information to the user device for storage in an MNO-specific memory area allocated for the MNO in a trusted environment of the user device. The MNO-specific 5G functionality information may instruct the user device to use an encryption key stored in the trusted environment or an Embedded Subscriber Identity Module (eSIM) of the user device to encrypt or decrypt subscriber identifier information of the user device. The encrypted subscriber identifier information is used for 5G communications exchanged between the user device and a core network of a wireless carrier network operated by the MNO.

20 Claims, 7 Drawing Sheets

(51) Int. Cl.
*H04W 12/04* (2021.01)
*H04W 8/18* (2009.01)
*H04W 4/12* (2009.01)
*H04W 12/0431* (2021.01)
*H04W 12/0433* (2021.01)
*H04W 84/04* (2009.01)

(52) U.S. Cl.
CPC ... *H04W 12/0431* (2021.01); *H04W 12/0433* (2021.01); *H04W 84/042* (2013.01)

(58) Field of Classification Search
CPC ..... H04W 12/40; H04W 12/43; H04W 12/45; H04W 12/72; H04W 4/12; H04W 4/50; H04W 84/042; H04W 8/183; H04W 8/205; H04W 8/26; H04L 63/0853
See application file for complete search history.

(56) References Cited

U.S. PATENT DOCUMENTS

2017/0317990 A1 11/2017 Kim et al.
2018/0060199 A1 3/2018 Li et al.
2019/0387407 A1* 12/2019 Jost ..................... H04W 60/00

* cited by examiner

MNO-SPECIFIC 5G FUNCTIONALITY DELIVERY WITH ESIM STORED ENCRYPTION KEYS IN USER DEVICE

CROSS-REFERENCE TO RELATED PATENT APPLICATION

This application claims priority to U.S. Provisional Patent Application No. 62/692,610, filed on Jun. 29, 2018, entitled "MNO Specific Allocation for eSIM," which is hereby incorporated by reference in its entirety.

BACKGROUND

Under current 3GPP standards, subscriber identifier information, such as an International Mobile Subscriber Identity (IMSI), is stored in the clear, i.e., unencrypted, in a memory of the user device or in a Universal Integrated Circuit Card (UICC) that is installed on the user device. The UICC is also be referred to as a Subscriber Identity Module (SIM). The IMSI is also only weakly encrypted when the IMSI is passed through an air interface between the user device and a core network of a mobile network operator (MNO). Such subscriber identifier information is also weakly encrypted as the information is passed between various components in the backend of the core network. In contrast, 3GPP 5G specifications require such subscriber identifier information to be strongly encrypted as such information passes through the air interface between the user device and the core network. For example, the IMSI is required to be encrypted into a Subscription Concealed Identifier (SUCI) for transfer between the user device and the core network via the air interface, as well as transfer between various backend network components in the core network. Likewise, a Mobile Station International Subscriber Directory Number (MSISDN) is also required to be encrypted into a Subscription Permanent Identifier (SUPI) for transfer between the user device and the core network via the air interface, as well as transfer between various backend network components of the core network.

Nevertheless, both the current 3GPP standard and the 3GPP 5G specifications permit each MNO to configure whether encryption and decryption of the subscriber identifier information at the user device are to be performed by the user device or the UICC (SIM) of the user device. Further, each MNO is also free to determine whether the encryption key that is used for the encryption or decryption of the subscriber identifier information is to be stored in a memory of the user device or in the onboard memory of the UICC (SIM). Recently, user using devices are increasingly moving to embedded UICCs (eUICCs), also referred to as embedded SIMs. An eUICC is an integrated circuit chip that is directly wired or soldered to a circuit board of a user device. The eUICC on a user device may have the capacity to store multiple eSIM profiles of multiple MNOs. Each eSIM profile may contain the specific carrier settings that enable the user device to receive telecommunication services from a corresponding MNO.

Further, as some MNOs rollout 5G telecommunication services before other MNOs, different MNOs may have different encryption requirements with respect to IMSIs and MSISDNs that must be adhered to by a user device. For example, a first MNO may require no subscriber identifier information encryption. A second MNO may require the use of an SUCI that is generated using an encryption key stored in an eSIM profile. A third MNO may require the use of an SUCI that is generated using an encryption key that is stored in the memory of the user device. In other words, the user device, such as a 5G-capable device, must cater to the different encryption requirements of multiple MNOs in order for the user device to roam or otherwise receive telecommunication services from the multiple MNOs. This means that the user device is no longer able to use a single default policy with respect to subscriber identifier information encryption that satisfies the encryption requirements of every MNO.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
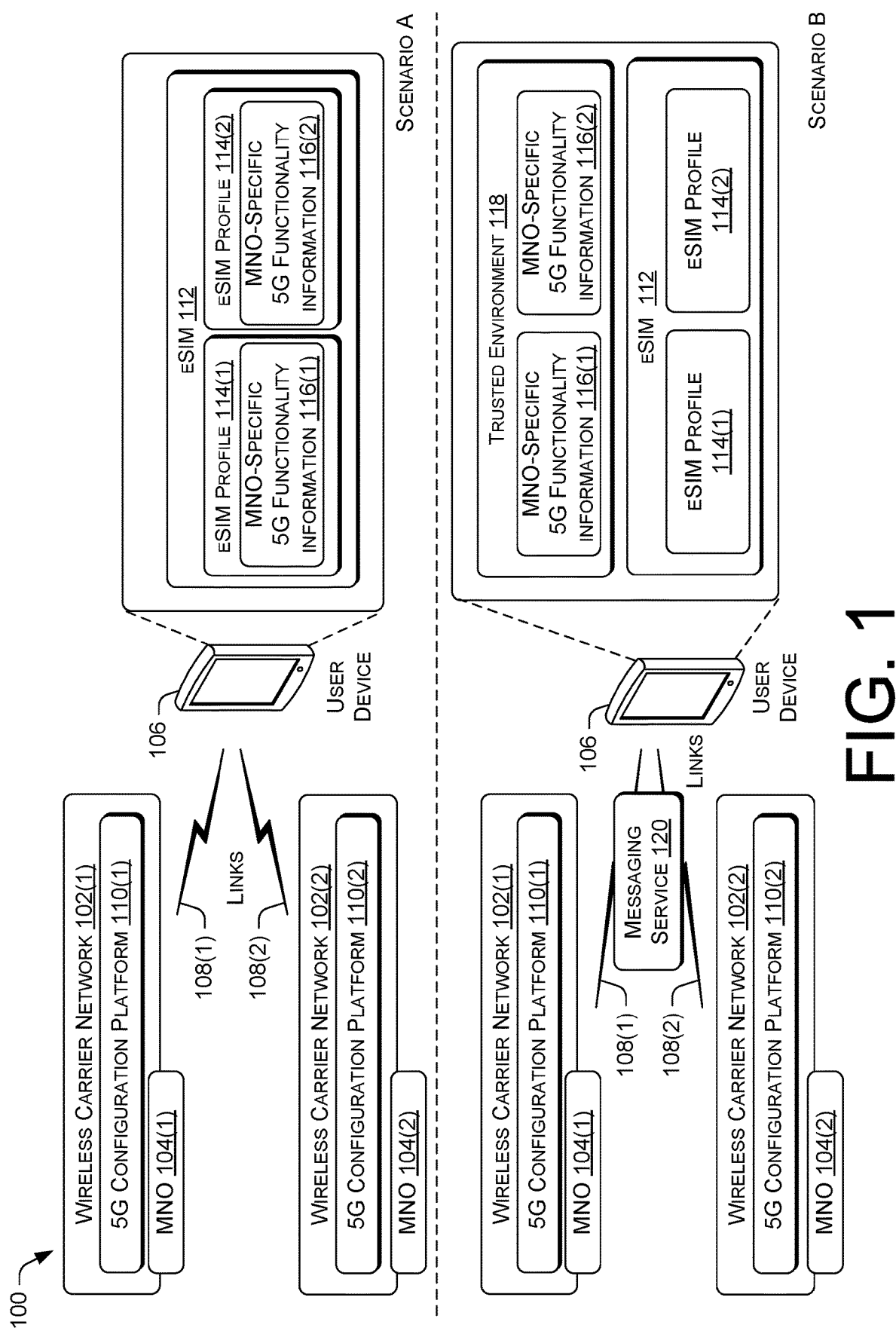
FIG. 1 illustrates an example architecture that enables the distribution of MNO-specific 5G functionality information for storage in an eSIM or a trusted environment of a user device.

This disclosure is directed to techniques that enable multiple MNOs to distribute their MNO-specific 5G functionality information to a user device. The MNO-specific 5G functionality information may be distributed by an MNO to a user device via an eSIM profile that is to be stored in an eSIM of the user device. The eSIM profile may be one of multiple such eSIM profiles that are stored in the eSIM of the user device. Alternatively, the MNO may distribute the MNO-specific 5G functionality information to the user device such that the information is stored by the user device in an allocated memory space in a trusted environment of the user device. Other allocated memory space in the trusted environment may store other MNO-specific 5G functionality information of other MNOs. The MNO-specific 5G functionality information that is distributed to the user device by a particular MNO may configure the user device or cause the user device to perform operations related to the use of the 5G telecommunication services provided by the particular MNO.

In some instances, different MNOs may have different encryption requirements with respect to subscriber identifier information (e.g., an IMSI, an MSISDN) that are passed via air interfaces between a user device and the core networks of the MNOs. For example, a first MNO may require no subscriber identifier information encryption profile for communication between the first MNO and the user device. A second MNO may require the use of an SUCI that is generated from the IMSI using an encryption key stored in an eSIM profile for communications passed between the second MNO and the user device. A third MNO may require the use of an SUCI that is generated using an encryption key that is stored in the memory of the user device for communication between the third MNO and the user device. Accordingly, the MNO-specific 5G functionality information provided by each of the MNOs to the user device may configure the use device to use a specific encryption key and a specific encryption algorithm to perform the subscriber identifier information encryption. For example, the specific encryption key may be an encryption key that is stored in the eSIM or the trusted environment of the user device. Likewise, the specific encryption algorithm may be an encryption algorithm that is stored in the eSIM or the trusted environment of the user device. Thus, the ability of multiple MNOs to distribute their corresponding MNO-specific 5G functionality information to a single user device may enable the user device to be properly configured for receiving 5G telecommunication services from the multiple MNOs, despite variations in the device configuration requirements of the multiple MNOs.

In various embodiments, an MNO may use a 5G configuration platform to distribute the MNO-specific 5G functionality information for storage in either the eSIM or the trusted environment of a user device. The distribution of the MNO-specific 5G functionality information for storage in the trusted environment offers several advantages. First, the distribution of the 5G functionality information for storage in the eSIM is carried out via the download of an update eSIM profile to the eSIM. However, in order to download the update eSIM profile of an MNO, the user device must be attached to the wireless carrier network of the MNO using an existing MNO-specific eSIM profile. This means that the distribution of the 5G functionality information for storage in the eSIM will fail if the user device is currently attached to the wireless carrier network of a different MNO. On the other hand, the distribution of 5G functionality information for storage in the trusted environment may be performed using third-party messaging services, such as Google Cloud Messaging (GCM), Apple Push Notification service (APNs), Windows Push Notification Service (WPNS), and/or so forth. Since these third-party messaging services are network-agnostic, the distribution of the 5G functionality information for storage in the trusted environment may be successfully performed irrespective of the wireless carrier network that is currently attached to by the user device.

Furthermore, as the use of Internet-of-Things (IoT) devices become more widespread, IoT devices are expected to constitute a great number of user devices served by 5G networks. In order to reduce manufacturing cost, IoT devices may be designed with minimal computing resources, e.g., processing power and memory, for executing eSIM functionalities. As such, distribution of the 5G functionality information for storage in a trusted environment, which is supported by the primary memory and processor of a user device, may offer performance gains on certain user devices. The techniques described herein may be implemented in a number of ways. Example implementations are provided below with reference to the following FIGS. 1-7.

Example Architecture

FIG. 1 illustrates an example architecture 100 that enables the distribution of MNO-specific 5G functionality information for storage in an eSIM or a trusted environment of a user device. The example architecture 100 may include multiple wireless carrier networks that are operated by multiple MNOs, such as a wireless carrier network 102(1) operated by the MNO 104(1), and a wireless carrier network 102(2) operated by the MNO 104(1). Each of the wireless carrier networks may provide a wide range of mobile communication services, as well as ancillary services and features, to subscribers and associated mobile device users. In various embodiments, a wireless carrier network may provide wireless communication between multiple user devices. Further, the wireless carrier network may also provide communications between the multiple user devices and user devices that are serviced by other telecommunications networks. The telecommunication services provided may include voice communication, multimedia communication, data communication, such as email, messaging, content streaming, content uploading, and/or so forth.

The wireless carrier network may be implemented using multiple interconnected networks. In various embodiments, the wireless carrier network may include multiple Radio Access Networks (RANs). The RANs may be connected to each other via regional ground networks. In turn, the regional ground networks may be connected to a core network of the wireless carrier network by a wide area network (WAN). Each regional portion of the wireless carrier network may include one or more RANs and a regional circuit and/or packet switched network and associated signaling network facilities. The wireless carrier network may provide telecommunication services in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), 5th Generation (5G), and/or so forth. In some embodiments, the core network of the wireless carrier network may be accessed via wired or wireless local area networks (LANs). For example, a wireless local area network may be a network that is established using Wi-Fi or Bluetooth standards and hardware.

A RAN of the wireless carrier network may include a number of base stations, also referred to as network cells. In some embodiments, the base stations may be in the form of nodes. Each node may include a base transceiver system (BTS) that communicates via an antenna system over an air-link with one or more user devices that are within range. The BTS may send radio communication signals to user devices and receive radio communication signals from user devices. The RANs may carry the communications of the user devices between the respective base stations and a core network of the wireless carrier network. The core network may connect to a public packet data communication network, such as the Internet. Data and voice communications via the RANs, the core network, and the Internet may support a variety of telecommunication services through the wireless carrier network 102.

In various embodiments, 2G and/or 3G network components in the core network may include a serving GPRS support node (SGSN) that routes voice calls to and from the public switched telephone network (PSTN), a Gateway GPRS Support Node (GGSN) that handles the routing of data communication between external packet switched networks and the core network. The network components may further include a Packet Data Network (PDN) gateway (PGW) that routes data traffic between the GGSN and the Internet. The 4G/5G components of the wireless carrier network 102 may include an Evolved Packet Core (EPC) and an IP Multimedia Subsystem (IMS) core.

Each of the wireless carrier networks 102(1) and 102(2) may provide telecommunication services to a user device 106 via a corresponding cellular communication link, such as the cellular communication link 108(1) and 108(2). Accordingly, the user device 106 may be capable of obtaining telecommunication and/or data communication services from the wireless carrier network 102. For example, the wireless carrier network 102(1) may be a home network of the user device 106, and the wireless carrier network 102(2) may be a roaming network. The backend servers in each of the wireless carrier network 102(1) and 102(2) may provide a 5G configuration platform, such as the 5G configuration platform 110(1) and 110(2). Each of the 5G configuration platforms is responsible for distributing MNO-specific 5G functionality information to the user device 106. The MNO-specific 5G functionality information that is distributed to the user device by a particular wireless carrier network operated by a corresponding MNO may configure the user device or cause the user device to perform operations related to the use of the 5G telecommunication services provided by the MNO.

In various embodiments, the user device 106 may be a consumer device or an M2M device. Consumer devices are network-capable devices that are generally marketed to individual consumers. For example, these devices may include a smartphone, a tablet computer, a smartwatch, a gaming console, and/or so forth. M2M devices are networked machines that use the telecommunication services provided by the wireless communication carrier to communicate with other networked machines. For example, an M2M monitoring device that is embedded on a vehicle may automatically send vehicle tracking and operation information to a remote support device at a control center. In another example, an M2M device in the form of a smart home appliance may automatically send diagnostic information to a monitoring device at a service center in case of device malfunction. In some instances, an M2M device may be an IoT device. An IoT device may have limited data processing capabilities, limited data storage capacity, and limited energy reserve in the form of a battery. For example, an IoT may be a mobile tracker that provides tracking data.

In scenario "A", the user device 106 may be equipped with an eSIM 112 that stores multiple eSIM profiles. Each eSIM profile may include information for accessing telecommunication services provided by a corresponding MNO. In various embodiments, the wireless carrier network 102(1) may use the 5G configuration platform 110(1) to send an eSIM profile 114(1) to the user device 106. The eSIM profile 114(1) includes MNO-specific 5G functionality information 116(1) of the MNO 104(1). In at least one embodiment, the 5G configuration platform 110(1) may use a file transfer service of the wireless carrier network 102(1) to deliver the eSIM profile 114(1) to the user device 106. For example, the file transfer service may implement various transfer protocols to send the eSIM profile 114(1) to the user device 106, such as Secure Copy Protocol (SCP), Secure File Transfer Protocol (SFTP), HTTP Secure (HTTPS), and/or so forth. The 5G configuration platform 110(1) may successfully deliver the eSIM profile 114(1) to the user device 106 when the user device 106 is attached to the wireless carrier network 102(1) via the cellular communication link 108(1). A user device is attached to a wireless carrier network when the user device is using a RAN of the wireless carrier network to directly connect to a core network of the wireless carrier network. Otherwise, the 5G configuration platform 110(1) would be unable to deliver the eSIM profile 114(1) to the user device 106. The eSIM profile 114(1) may be stored by the user device in the eSIM 112. Subsequently, the MNO-specific 5G functionality information 116(1) may be used by the user device 106 to perform predetermined operations when obtaining 5G telecommunication services from the MNO 104(1).

Likewise, the wireless carrier network 102(2) may use the 5G configuration platform 110(2) to send an eSIM profile 114(2) to the user device 106. The eSIM profile 114(2) includes MNO-specific 5G functionality information 116(2) of the MNO 104(2). In at least one embodiment, the 5G configuration platform 110(2) may use a file transfer service of the wireless carrier network 102(2) to deliver the eSIM profile 114(2) to the user device 106. This file transfer service may be similar in nature to the file transfer service of the wireless carrier network 102(1). Likewise, the 5G configuration platform 110(2) may successfully deliver the eSIM profile 114(2) to the user device 106 when the user device 106 is attached to the wireless carrier network 102(2) via the cellular communication link 108(2). Otherwise, the 5G configuration platform 110(2) would be unable to deliver the eSIM profile 114(2) to the user device 106. The eSIM profile 114(2) may be stored by the user device in the eSIM 112. Subsequently, the user device 106 may use the MNO-specific 5G functionality information 116(2) to perform predetermined operations when obtaining 5G telecommunication services from the MNO 104(2).

In scenario "B" the user device 106 may be equipped with a trusted environment 118 in addition to the eSIM 112. Accordingly, the wireless carrier network 102(1) may rely on a file transfer service of the wireless carrier network 102(1) to deliver the eSIM profile 114(1) to the user device 106 when the user device 106 is attached to the wireless carrier network 102(1) via the cellular communication link 108(1). The eSIM profile 114(1) may be stored by the user device 106 in the eSIM 112. On the other hand, the 5G configuration platform 110(1) may use a third-party messaging service 120 to deliver the MNO-specific 5G functionality information 116(1) to the user device 106. In various embodiments, the third-party messaging service 120 may be one of GCM, APNs, WPNS, and/or so forth. Since these third-party messaging services are network-agnostic, the third-party messaging service 120 is able to deliver the 5G functionality information 116(2) to the user device 106 as long as the user device 106 is reachable by the messaging service 120 via any wireless carrier network or any other network. The user device 106 may store the MNO-specific 5G functionality information 116(1) in an allocated memory space of the trusted environment 118. Subsequently, the MNO-specific 5G functionality information 116(1) may be used by the user device 106 to perform predetermined operations when obtaining 5G telecommunication services from the MNO 104(1).

Likewise, the wireless carrier network 102(2) may rely on a file transfer service to deliver the eSIM profile 114(2) to the user device 106 when the user device 106 is attached to the wireless carrier network 102(2) via the cellular communication link 108(2). However, the 5G configuration platform 110(2) may use the third-party messaging service 120, or another third-party messaging service, to deliver the MNO-specific 5G functionality information 116(2) to the user device 106. The third-party messaging service 120 is able to deliver the 5G functionality information 116(2) to the user device 106 as long as the user device 106(2) is reachable by the messaging service 120 via any wireless carrier network or any other network. The eSIM profile 114(2) may be stored by the user device in an allocated memory space of the trusted environment 118. Subsequently, the MNO-specific 5G functionality information 116(2) may be used by the user device 106 to perform predetermined operations when obtaining 5G telecommunication services from the MNO 104(2).

Example Computing Device Components

Figure 2:
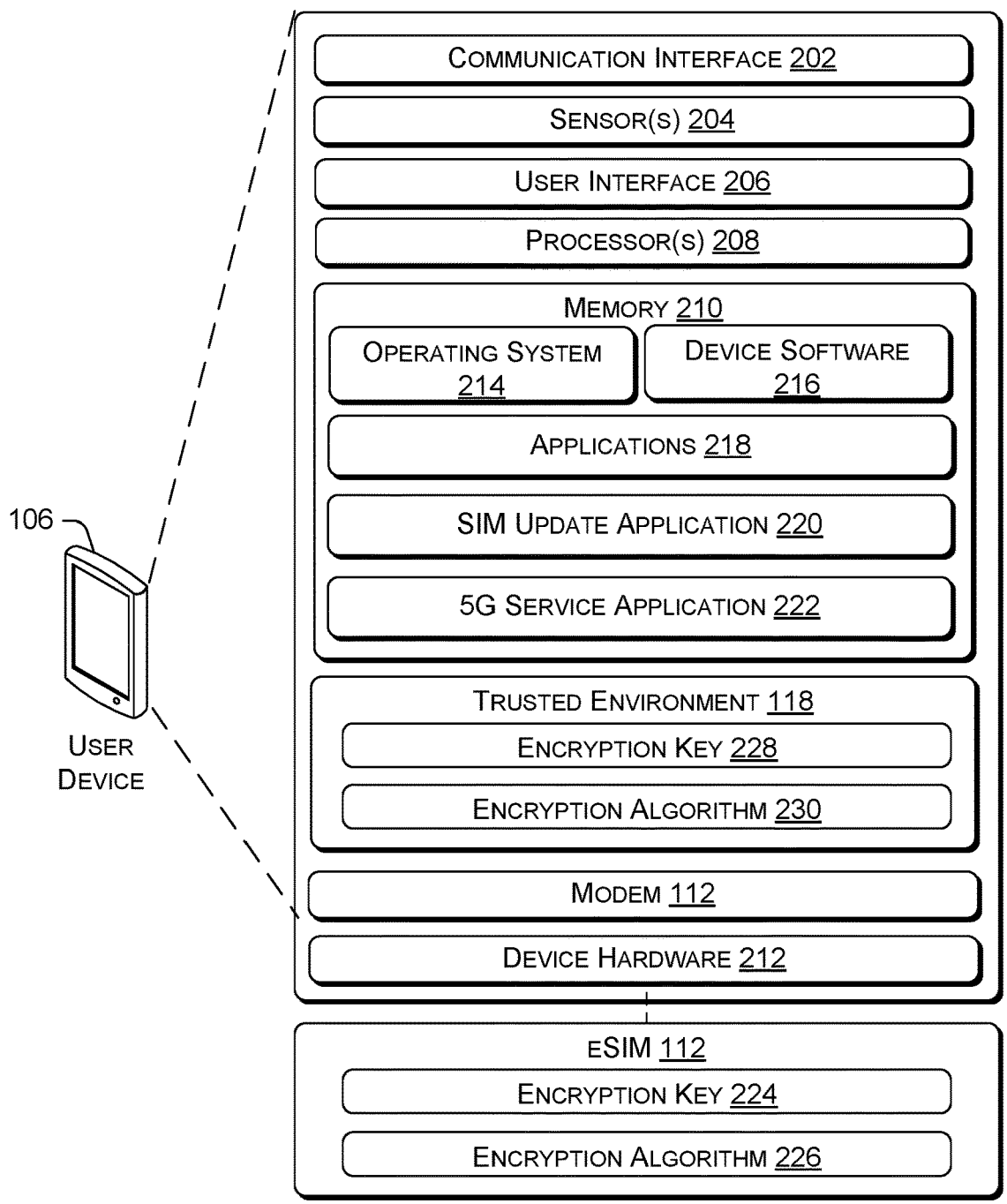
FIG. 2 is a block diagram showing various components of an illustrative user device that stores MNO-specific 5G functionality information in an eSIM or a trusted environment.

FIG. 2 is a block diagram showing various components of an illustrative user device that stores MNO-specific 5G functionality information in an eSIM or a trusted environment. The user device 106 may include a communication interface 202, one or more sensors 204, a user interface 206, one or more processors 208, memory 210, and device hardware 212. The communication interface 202 may include wireless and/or wired communication components that enable the electronic device to transmit or receive voice or data communication via the wireless carrier network, as well as other telecommunication and/or data communication networks. The sensors 204 may include a proximity sensor, a compass, an accelerometer, biometric sensors, cameras, and/or a global positioning system (GPS) sensor, among other appropriate sensors. The proximity sensor may detect the movement of objects that are proximate to the user device 106. The compass, the accelerometer, and the GPS sensor may detect orientation, movement, and geolocation of the user device 106. The cameras may capture images of the environment around the user device 106.

The user interface 206 may enable a user to provide inputs and receive outputs from the user device 106. The user interface 206 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 210 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 212 may include a cellular modem that enables the user device 106 to perform telecommunication and data communication with the wireless carrier network 102, as well as a short-range transceiver that enables the device to connect to other devices via short-range wireless communication links. The device hardware 212 may further include signal converters, antennas, hardware decoders and encoders, graphics processors, and/or the like that enable the user device 106 to execute applications and provide telecommunication and data communication functions. The cellular modem may be driven by modem software to perform telecommunication and data communication with a wireless communication network. The modem software may be firmware that is stored in dedicated non-volatile memory of the user device 106. Such non-volatile memory may include read-only memory (ROM), erasable programmable read-only memory (EPROM), or flash memory. The user device is further equipped with the eSIM 112 that stores multiple eSIM profiles.

The one or more processors 208 and the memory 210 may implement the trusted environment 118. The trusted environment 118 is an isolated execution space that is provided by dedicated software and/or hardware of a device. For example, the trusted environment 118 may employ a dedicated memory space or memory chip that is not accessible by applications and/or hardware components not located in the dedicated memory space or memory chip, unless such applications and/or hardware components are provided with special access privileges through secure communication channels and APIs. In alternative instances, the applications that reside in the trusted environment 118 may be executed by a dedicated processor. The isolation of the trusted environment 118 provides a high level of security for the execution of code or the processing of data stored in the execution space.

The one or more processors 208 and the memory 210 of the user device 106 may implement an operating system 214, device software 216, one or more applications 218, a SIM update application 220, and a 5G service application 222. Such software may include routines, program instructions, objects, and/or data structures that are executed by the processors 208 to perform particular tasks or implement particular abstract data types.

The operating system 214 may include components that enable the user device 106 to receive and transmit data via various interfaces (e.g., user controls, communication interface 202, and/or memory input/output devices). The operating system 214 may also process data using the one or more processors 208 to generate outputs based on inputs that are received via the user interface 206. For example, the operating system 214 may provide an execution environment for the execution of the applications 218. The operating system 214 may include a presentation component that presents the output (e.g., display the data on an electronic display, store the data in memory, transmit the data to another electronic device, etc.).

The operating system 214 may include an interface layer that enables applications to interface with the modem and/or the communication interface 202. The interface layer may comprise public APIs, private APIs, or a combination of both public APIs and private APIs. Additionally, the operating system 214 may include other components that perform various other functions generally associated with an operating system. The device software 216 may include software components that enable the user device to perform functions. For example, the device software 216 may include basic input/output system (BIOS), bootrom, or a bootloader that boots up the user device 106 and executes the operating system 214 following power-up of the device.

The applications 218 may include applications that provide utility, entertainment, and/or productivity functionalities to a user of the user device 106. For example, the applications 218 may include telephony applications, electronic mail applications, remote desktop applications, web browser applications, navigation applications, office productivity applications, multimedia streaming applications, an online shopping application, and/or so forth.

The SIM update application 220 may receive update eSIM profiles from a 5G configuration platform of a wireless carrier network via the modem. In various embodiments, an update eSIM profile may be encrypted with a secret key via symmetric or asymmetric encryption, and the SIM update application 220 may decrypt the update eSIM profile with the secret key or a corresponding key. Alternatively, the update eSIM profile may be protected by a message digest that is based on a secret, and the SIM update application 220 may use the same secret to validate the update eSIM profile. Thus, a validated update eSIM profile may be stored by the SIM update application 220 in the eSIM 112, while an invalid update eSIM profile is discarded. In some embodiments, the SIM update application 220 may transfer a received update eSIM profile to the eSIM 112 via a communication channel between the modem and the eSIM 112. The SIM update application 220 may replace an existing eSIM profile in the eSIM 112 with the update eSIM profile. The SIM update application 220 may use the modem to send a success acknowledgment message to the 5G configuration platform following the storage of the update eSIM profile in the eSIM 112. In some instances, the modem software and/or other applications on the user device 106 may perform operations according to the MNO-specific 5G functionality information in the update eSIM profile when obtaining 5G telecommunication services from the corresponding MNO. For example, the operations may include using an encryption key 224 stored in the eSIM 112 and/or an encryption algorithm 226 executed by the eSIM 112 to encrypt an IMSI into an SUCI. In another example, the operations may include using the encryption key 224 stored in the eSIM 112 and/or the encryption algorithm 226 executed by the eSIM 112 to encrypt an MSISDN into a SUPI. In some embodiments, the encryption key 224 may be a public key of an asymmetric public-private key pair, in which the private key is stored by the core network of a wireless carrier network that provides telecommunication services to the user device 106. In at least one embodiment, the SIM update application 220 may be a part of the modem software instead of a standalone application.

The 5G service application 222 may receive commands from 5G configuration platforms of different MNOs to allocate memory spaces for the storage of corresponding MNO-specific functionality information. The 5G service application 222 may receive such commands via a third-party messaging service, such as the messaging service 120. In turn, the 5G service application 222 may direct the trusted environment 118 to perform the allocation of memory space. In at least some embodiments, the 5G service application 222 may be notified by the trusted environment 118 of the success or failure of the allocation. In turn, the 5G service application 222 may use the messaging service 120 to report such success or failure to the corresponding 5G configuration platform.

Furthermore, the 5G service application 222 may receive MNO-Specific 5G functionality information of different MNOs via the messaging service for storage in the allocated memory spaces. In various embodiments, the MNO-Specific 5G functionality information from an MNO may be encrypted with a secret key via symmetric or asymmetric encryption, and the 5G service application 222 may decrypt the MNO-Specific 5G functionality information with the secret key or a corresponding key. Alternatively, the MNO-Specific 5G functionality information may be protected by a message digest that is based on a secret, and the 5G service application 222 may use the same secret to validate the MNO-Specific 5G functionality information. Thus, validated MNO-Specific 5G functionality information may be stored by the 5G service application 222 in the corresponding allocated memory space, while invalid MNO-Specific 5G functionality information is discarded. In at least some embodiments, the 5G service application 222 may be notified by the trusted environment of the success or failure of the information storage. In turn, the 5G service application 222 may use the messaging service to report such success or failure to the corresponding 5G configuration platform.

Subsequently, the modem software and/or other applications on the user device 106 may perform operations according to the MNO-specific 5G functionality information in the trusted environment when obtaining 5G telecommunication services from the corresponding MNO. For example, the operations may include using an encryption key 228 stored in the trusted environment 118 and/or an encryption algorithm 230 stored and executed by the trusted environment 118 to encrypt an IMSI into an SUCI. In another example, the operations may include using the encryption key 228 stored in the trusted environment 118 and/or the encryption algorithm 230 stored and executed by the trusted environment 118 to encrypt an MSISDN into a SUPI. In some embodiments, the encryption key 228 may be a public key of an asymmetric public-private key pair, in which the private key is stored by the core network of a wireless carrier network that provides telecommunication services to the user device 106. However, in alternative embodiments, the encryption key 228 may be stored in the memory 210 instead of the trusted environment 118, and the encryption algorithm 230 may be stored in the memory 210 and executed by the processors 208 outside of the trusted environment 118. In some instances, the 5G service application 222 may be stored in the trusted environment 118 instead of the memory 210.

Example 5G Configuration Platform

Figure 3:
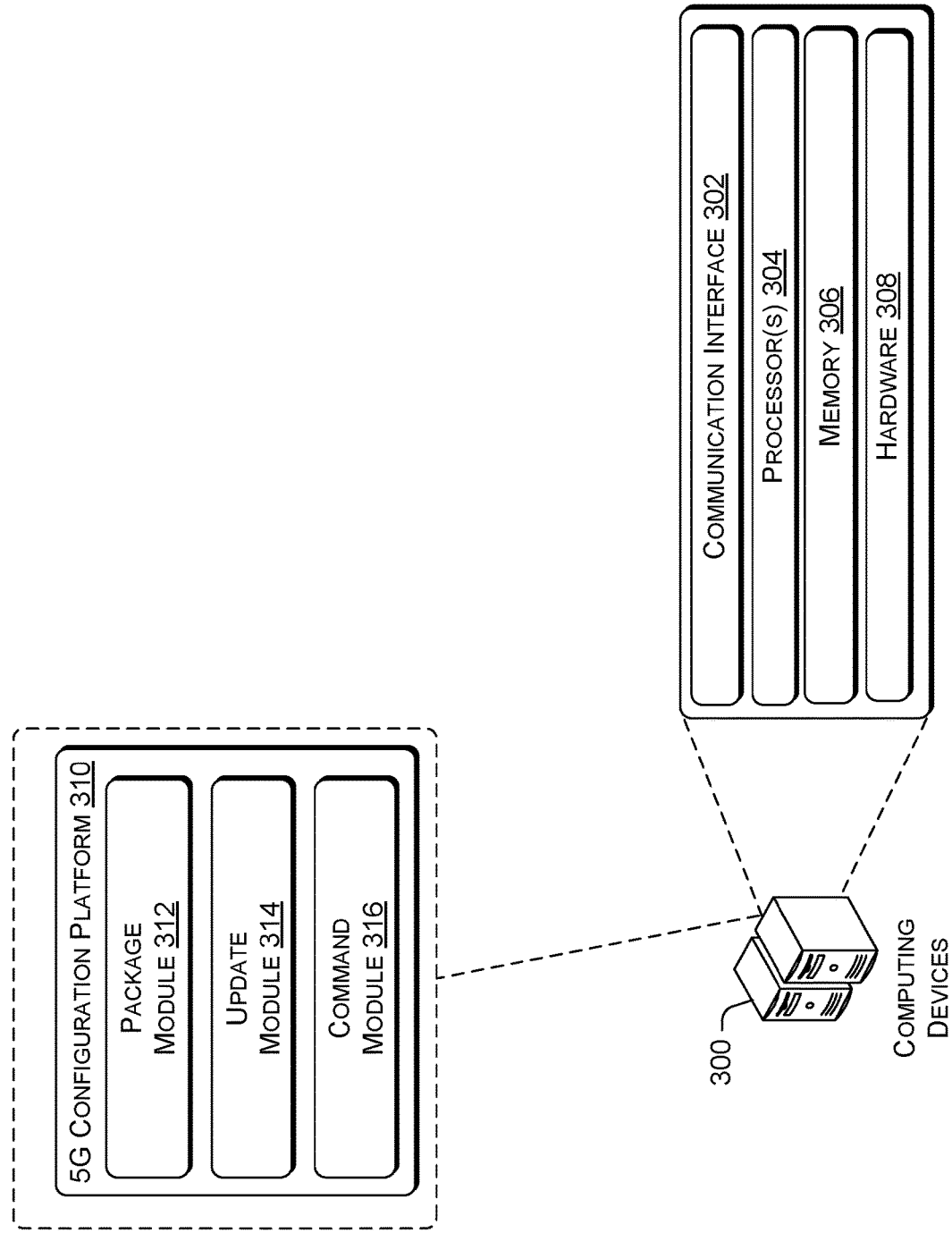
FIG. 3 is a block diagram showing various components of one or more illustrative computing devices that support the distribution of MNO-specific 5G functionality information for storage in an eSIM or a trusted environment of a user device.

FIG. 3 is a block diagram showing various components of one or more illustrative computing devices that support the distribution of MNO-specific 5G functionality information for storage in an eSIM or a trusted environment of a user device. The computing devices 300 may include a communication interface 302, one or more processors 304, memory 306, and hardware 308. The communication interface 302 may include wireless and/or wired communication components that enable the computing devices 300 to transmit data to and receive data from other networked devices. The hardware 308 may include additional user interfaces, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. In other embodiments, the computing devices 300 or components thereof may be virtual computing devices in the form of virtual machines or software containers that are hosted in a computing cloud.

The computing devices 300 may implement various back-end services and components of the wireless carrier network 102, such as a 5G configuration platform 310. The 5G configuration platform 310 may include a package module 312, an update module 314, and a command module 316. The modules may include routines, code segments, program instructions, objects, and/or data structures that perform particular tasks or implement particular abstract data types.

The package module 312 may be directed by the update module 314 to determine the distribution format of the 5G MNO-specific functionality information for a user device. In other words, the package module 312 may determine whether the 5G MNO-specific functionality information for a user device is to be delivered to the user device via an eSIM profile for storage in an eSIM of the user device, or via an update package to the trusted environment of the user device. In various embodiments, the package module 312 may use a policy database to make such a distribution format determination. The policy database may specify such device update settings based on the identities of wireless carrier networks that are providing services to user devices. For example, policies in the policy database may specify that user devices serviced by a first wireless carrier network that is identified by a first Mobile Network Code (MNC) is to be provided with the 5G MNO-specific functionality information via eSIM profiles, while user devices serviced by a second wireless carrier network that is identified by a second MNC is to be provided with the 5G MNO-specific functionality information via downloads to the trusted environments of such user devices.

In other instances, the policy database may determine the distribution format based on the device type of the user devices. The device type may be designated according to information such as device manufacturer, device model, device version, device capability, and/or so forth. Device capability may refer to whether or not a device is a 5G-capable device. For example, policies in the policy database may specify that user devices of a first device type are to be provided with the 5G MNO-specific functionality information via eSIM profiles, while user devices of a second type are to be provided with the 5G MNO-specific functionality information via downloads to the trusted environments of such user devices. Other policies in the policy database may specify the distribution format based on other factors, such as the geographical regions in which the user devices are located, time of day of the distribution, network congestion at the time of distribution, and/or so forth.

The update module 314 may deliver MNO-specific 5G functionality information to user devices. In various embodiments, the update module 314 may include a retrieval function that receives MNO-specific 5G functionality information from a computing device of an MNO via a file transfer service, or alternatively retrieves the MNO-specific 5G functionality information from a data store in response to a request from the MNO. For example, the request may originate from a business support system (BSS), an online charging system (OCS), and/or some other backend service of the MNO. The request from the MNO may include identification information of the MNO-specific 5G functionality information (e.g., update name, release version, etc.), an identifier of the MNO associated with the MNO-specific 5G functionality information, an identifier of a target user device for the MNO-specific 5G functionality information, instructions for executing the distribution (e.g., source of the MNO-specific 5G functionality information, time/date of update delivery, delivery service method, security settings for the delivery, number of delivery retry attempts, etc.), and/or so forth. Accordingly, the update module 314 may use the package module 312 to determine the distribution format of the 5G MNO-specific functionality information for the target user device. Thus, if the MNO-specific 5G functionality information is to be delivered to the target user device via an eSIM profile, the update module 314 may generate an update eSIM profile that includes the MNO-specific 5G functionality information for distribution via a file transfer service. However, if the MNO-specific 5G is to be delivered to the trusted environment of the target user device, the update module 314 may initiate a messaging service to deliver an update package that includes information to the target user device.

In various embodiments, the update module 314 may include an interface function that directs a messaging service or a file transfer service to establish a communication session for transferring an update package to the target user device. In some embodiments, the update module 314 may further include a conversion function that performs encryption, validation, formatting, and/or other preparation tasks to ready the update package or the eSIM profile for transfer to the target user device. A notification function of the update module 314 may receive update success or failure notifications from a target user device via a file transfer service or a messaging service. In turn, the update module 314 may use the messaging service to notify the MNO of the success or failure of the distribution for a target user device. The update module 314 may maintain an update database that tracks information regarding the distribution of MNO-specific 5G functionality information to each user device. The data tracked by the update database for the distribution of MNO-specific 5G functionality information to a target user device may include the identifier of the MNO-specific 5G functionality information provided at each distribution, the MNO associated with each distribution of the MNO-specific 5G functionality information, the date and time of each distribution, the distribution format of each distribution, whether a memory space was successfully allocated in a trusted environment of the target user device for the MNO-specific 5G functionality information of an MNO, the successful and failure of each distribution, the number of distribution attempts for each distribution, and/or so forth.

In some embodiments, the update module 314 may direct a command module 316 to command a target user device to create an allocated memory space in the trusted environment of a target user device. The update module 314 may perform this task prior to distributing an update package to the trusted environment of the target user device. In such embodiments, the command module 316 may check the update database to determine whether a memory space was previously successfully allocated in a trusted environment of the target user device for storing an update package. Thus, if no memory space was previously allocated, the update module 314 may direct the target user device to allocate a memory space. In various embodiments, the command module 316 may send the command to the target user device via a messaging service. For example, the messaging service may be a service such as GCM, APN, or WPNS. Subsequently, the command module 316 may receive a notification from the target user device via the messaging service indicating that the memory space has been allocated. Accordingly, the command module 316 may notify the update module 314 to proceed with the distribution of the update package. In turn, the update module 314 may record the allocation of the memory space in the update database. However, if the memory space was previously successfully allocated for storing the update package, the command module 316 may notify the update module 314 to proceed with the distribution of the update package.

Example Processes

FIGS. 4-7 present illustrative processes 400-700 that enable the distribution of MNO-specific 5G functionality information for storage in an eSIM or a trusted environment of a user device. Each of the processes 400-700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-800 are described with reference to the architecture 100 of FIG. 1.

Figure 4:
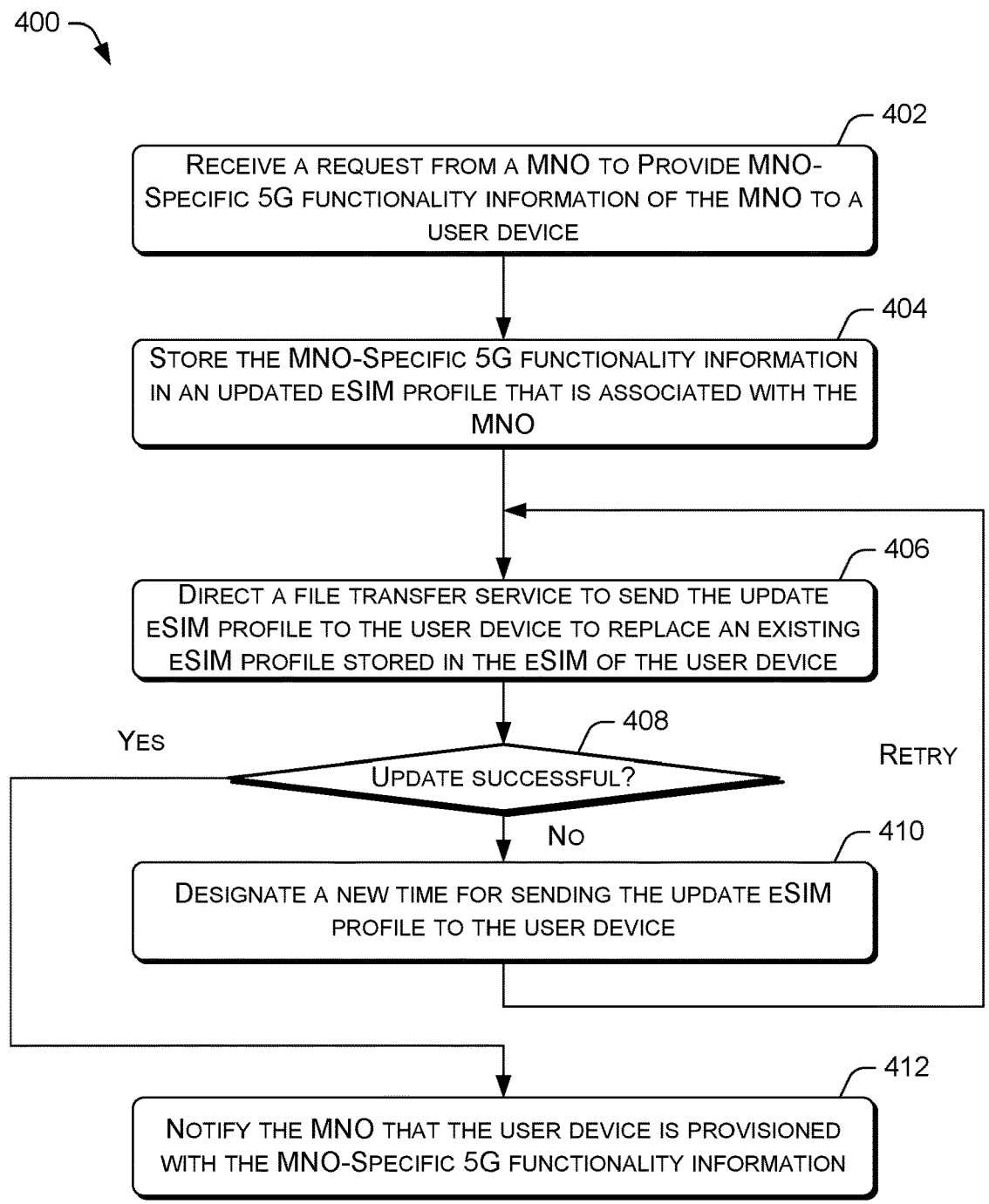
FIG. 4 is a flow diagram of an example process for a 5G configuration platform to use an eSIM profile to distribute 5G MNO-specific functionality information for storage in an eSIM of a user device.

FIG. 4 is a flow diagram of an example process 400 for a 5G configuration platform to use an eSIM profile to distribute 5G MNO-specific functionality information for storage in an eSIM of a user device. At block 402, the 5G configuration platform of an MNO may receive a request from the MNO to provide MNO-specific 5G functionality information of the MNO to a user device. In various embodiments, the request may originate from a business support system (BSS), an online charging system (OCS), and/or some other backend service of the MNO. At block 404, the 5G configuration platform may store the MNO-specific 5G functionality information in an update eSIM profile that is associated with the MNO. The eSIM profile is associated with the MNO in the sense that the eSIM profile may be used by a user device to obtain telecommunication services from a wireless carrier network operated by the MNO. In various embodiments, the MNO-specific 5G functionality information may be used by the user device to perform predetermined operations when obtaining 5G telecommunication services from the MNO.

At block 406, the 5G configuration platform may direct a file transfer service to send the update eSIM profile to the user device to replace an existing eSIM profile stored in the eSIM of the user device. In some embodiments, the file transfer service may use various transfer protocols to send the eSIM profile to the user device, such as Secure Copy Protocol (SCP), Secure File Transfer Protocol (SFTP), HTTP Secure (HTTPS), and/or so forth.

At decision block 408, the 5G configuration platform may determine whether the replacement of the existing eSIM profile in the eSIM with the update eSIM profile is successful. In various embodiments, the user device may send a notification to the file transfer service indicating the success or failure of the eSIM profile update. In turn, the file transfer service may notify the 5G configuration platform of the success or failure. For example, the notifications may be communicated between the various entities using different communication protocols, such as HTTP or HTTPS.

Thus, if the update of the eSIM profile is unsuccessful ("no" at decision block 408), the process 400 may proceed to block 410. At block 410, the 5G configuration platform may designate a new time for sending the update eSIM profile to the user device. Subsequently, the process 400 may loop back to block 406. In some embodiments, the new time designated may result in a real-time or near real-time update retry attempt. In other embodiments, the new time designated may reschedule the update retry attempt into the future. In various embodiments, the operation in the block 410 may be repeated for a predetermined number of unsuccessful update attempts.

However, if the update of the eSIM profile is successful ("yes" at decision block 408), the process 400 may proceed to block 412. At block 412, the 5G configuration platform may notify the MNO that the user device is provisioned with the MNO-specific 5G functionality information. For example, the notifications may be communicated to the 5G configuration platform using different communication protocols, such as HTTP or HTTPS, or via a messaging service.

Figure 5:
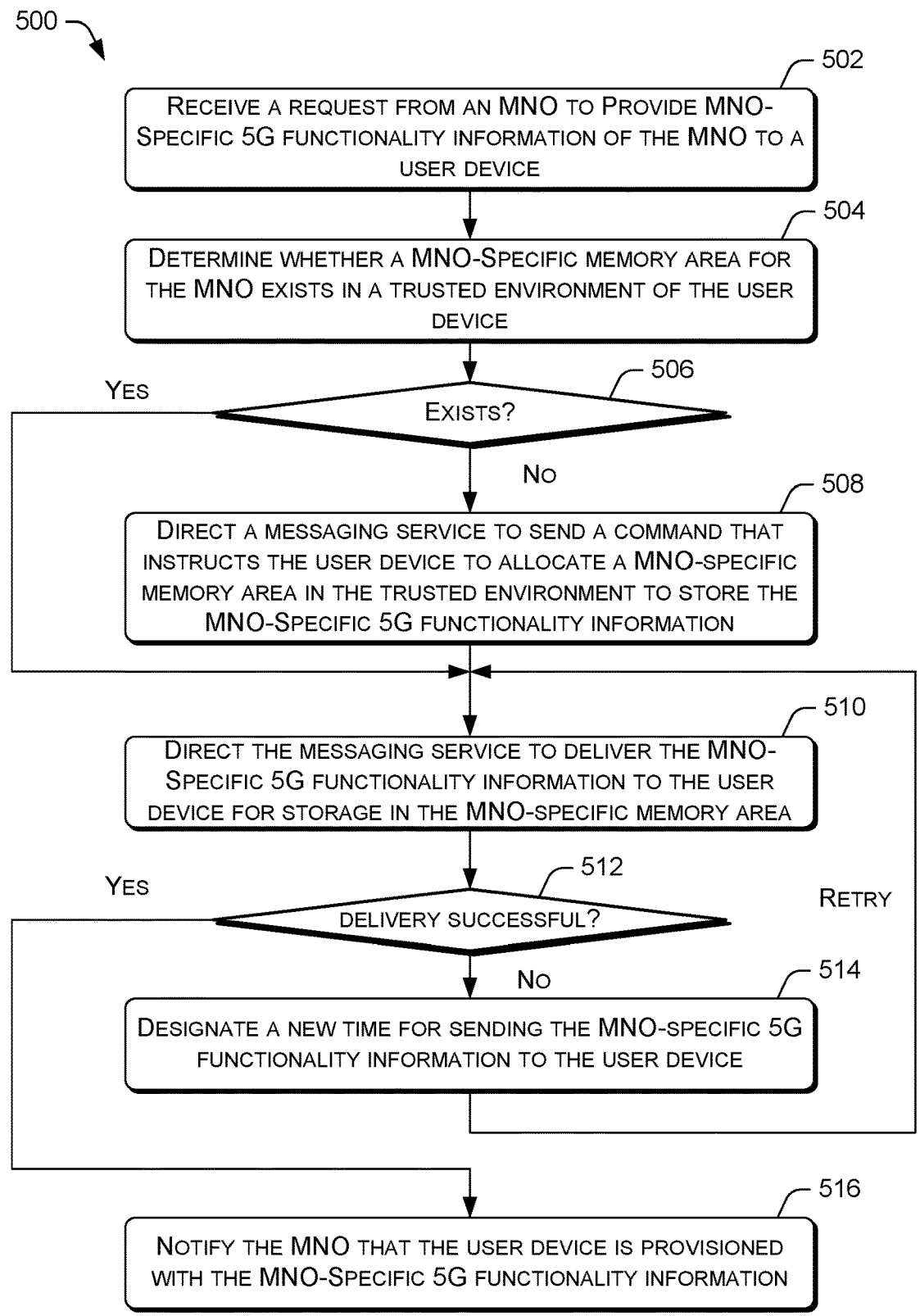
FIG. 5 is a flow diagram of an example process for the 5G configuration platform to use a messaging service to distribute 5G MNO-specific functionality information for storage in a trusted environment of a user device.

FIG. 5 is a flow diagram of an example process 500 for the 5G configuration platform to use a messaging service to distribute 5G MNO-specific functionality information for storage in a trusted environment of a user device. At block 502, the 5G configuration platform of an MNO may receive a request from the MNO to provide MNO-specific 5G functionality information of the MNO to a user device. In various embodiments, the request may originate from a business support system (BSS), an online charging system (OCS), and/or some other backend service of the MNO. At block 504, the 5G configuration platform may determine whether an MNO-specific memory area for the MNO exists in a trusted environment of the user device. In some embodiments, the 5G configuration platform may determine that the MNO-specific memory area exists when an update database of the 5G configuration platform indicates that the user device has previously received MNO-specific 5G functionality information of the MNO. On the other hand, if the update database indicates that the user device has not previously received such information, the 5G configuration platform may determine that no MNO-specific memory area exists on the user device. At decision block 506, if the 5G configuration platform determines that the MNO-specific memory area does not exist ("no" at decision block 506), the process 500 may proceed to block 508. At block 508, the 5G configuration platform may direct a messaging service to send a command that instructs the user device to allocate an MNO-specific memory area in the trusted environment to store the MNO-specific 5G functionality information. In various embodiments, the messaging service may be one of GCM, APNs, WPNS, and/or so forth. Subsequently, the process 500 may proceed to block 510. At block 510, the 5G configuration platform may direct the messaging service to deliver the MNO-specific 5G functionality information to the user device for storage in the MNO-specific memory area. However, if the 5G configuration platform determines that the MNO-specific memory area does exist ("yes" at decision block 506), the process 500 may proceed directly block 510.

At decision block 512, the 5G configuration platform may determine whether the delivery of the MNO-specific 5G functionality information to the user device is successful. In various embodiments, the user device may send a notification to the messaging service indicating the success or failure of the eSIM profile update. In turn, the messaging service may notify the 5G configuration platform of the success or failure.

According, if the delivery of the MNO-specific 5G information is not successful ("no" at decision block 512), the process 500 may proceed to block 514. At block 514, the 5G configuration platform may designate a new time for sending the MNO-specific 5G functionality information to the user device. In some embodiments, the new time designated may result in a real-time or near real-time update retry attempt. In other embodiments, the new time designated may reschedule the update retry attempt into the future. In various embodiments, the operation in the block 510 may be repeated for a predetermined number of unsuccessful update attempts.

However, if the delivery of the MNO-specific 5G information is successful ("yes" at decision block 512), the process 500 may proceed to block 516. At block 516, the 5G configuration platform may notify the MNO that the user device is provisioned with the MNO-specific 5G functionality information. For example, the notifications may be communicated to the 5G configuration platform using different communication protocols, such as HTTP or HTTPS, or via a messaging service.

Figure 6:
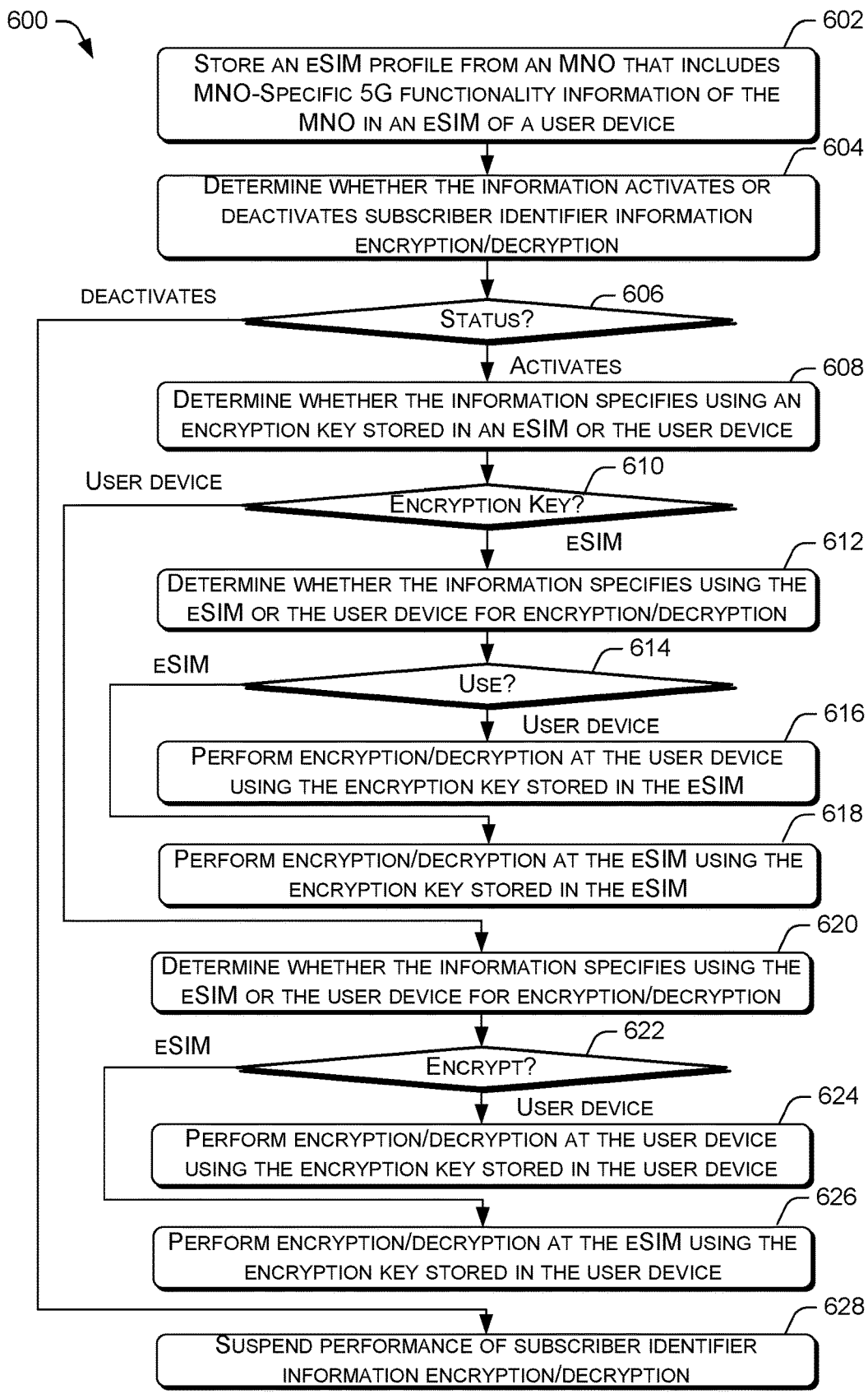
FIG. 6 is a flow diagram of an example process for a user device to use 5G MNO-specific functionality information stored in an eSIM profile to perform subscriber identifier information encryption.

FIG. 6 is a flow diagram of an example process 600 for a user device to use 5G MNO-specific functionality information stored in an eSIM profile to perform subscriber identifier information encryption. At block 602, the user device may store an eSIM profile from an MNO that includes MNO-specific 5G functionality information of the MNO in an eSIM of the user device.

At block 604, the user device may determine whether the MNO-specific 5G functionality information in the eSIM profile activates or deactivates subscriber identifier information encryption/decryption. In other embodiments, the information may include a revocation of the encryption key used for the subscriber identifier information encryption/decryption. At decision block 606, if the user device determines that the information activates the subscriber identifier information encryption/decryption, the process 600 may proceed to block 608. At block 608, the user device may determine whether the information specifies using an encryption key stored in an eSIM or the user device. At decision block 610, if the information specifies using the encryption key stored in the eSIM of the user device, the process 600 may proceed to block 612.

At block 612, the user device may determine whether the information specifies using the eSIM or the user device for encryption/decryption. At decision block 614, if the user device determines that the information specifies the use of the user device, the process 600 may proceed to block 616. For example, the information may specify the use of an encryption algorithm stored in a memory of the user device to perform the encryption/decryption. At block 616, the user device may perform the encryption/decryption at the user device using the encryption key stored in the eSIM. Returning to decision block 614, if the user device determines that the information specifies the use of the eSIM, the process 600 may proceed to block 618. For example, the information may specify the use of an encryption algorithm stored in the eSIM to perform the encryption/decryption. At block 618, the user device may perform the encryption/decryption at the eSIM using the encryption key stored in the eSIM.

Returning to decision block 610, if the information specifies using the encryption key stored in the user device, the process 600 may proceed to block 620. At block 620, the user device may determine whether the information specifies using the eSIM or the user device for encryption/decryption. At decision block 622, if the user device determines that the information specifies the use of the user device, the process 600 may proceed to block 624. At block 624, the user device may perform the encryption/decryption at the user device using the encryption key stored in the user device. Returning to decision block 622, if the user device determines that the information specifies the use of the eSIM, the process 600 may proceed to block 626. At block 626, the user device may perform the encryption/decryption at the eSIM using the encryption key stored in the user device.

Returning to decision block 606, if the user device determines that the information deactivates the subscriber identifier information encryption/decryption, the process 600 may proceed to block 628. For example, the information may include a specific command for the user device to terminate subscriber identifier information encryption/decryption or a revocation of an encryption key. At block 628, the user device may suspend performance of the subscriber identifier information encryption/decryption.

Figure 7:
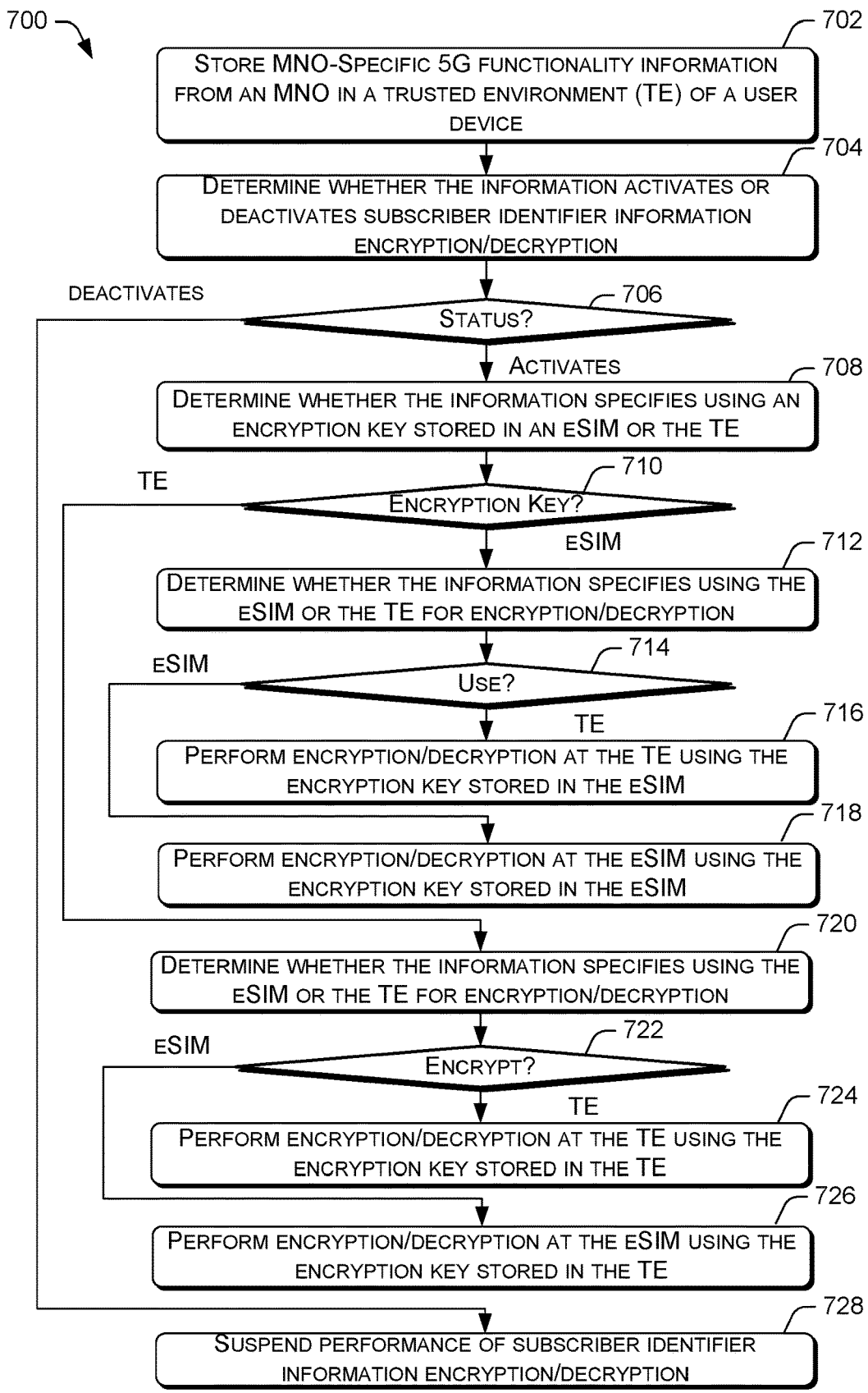
FIG. 7 is a flow diagram of an example process for a user device to use 5G MNO-specific functionality information stored in a trusted environment to perform subscriber identifier information encryption.

FIG. 7 is a flow diagram of an example process 700 for a user device to use 5G MNO-specific functionality information stored in a trusted environment to perform subscriber identifier information encryption. At block 702, the user device may store the MNO-specific 5G functionality information of the MNO in a trusted environment of the user device.

At block 704, the user device may determine whether the MNO-specific 5G functionality information activates or deactivates subscriber identifier information encryption/decryption. In other embodiments, the information may include a revocation of the encryption key used for the subscriber identifier information encryption/decryption. At decision block 706, if the user device determines that the information activates the subscriber identifier information encryption/decryption, the process 700 may proceed to block 708. At block 708, the user device may determine whether the information specifies using an encryption key stored in an eSIM or the trusted environment of the user device. At decision block 710, if the information specifies using the encryption key stored in the eSIM of the user device, the process 700 may proceed to block 712.

At block 712, the user device may determine whether the information specifies using the eSIM or the trusted environment of the user device for encryption/decryption. At decision block 714, if the user device determines that the information specifies the use of the trusted environment, the process 700 may proceed to block 716. For example, the information may specify the use of an encryption algorithm stored in the trusted environment of the user device to perform the encryption/decryption. At block 716, the user device may perform the encryption/decryption at the trusted environment using the encryption key stored in the eSIM. Returning to decision block 714, if the user device determines that the information specifies the use of the eSIM, the process 700 may proceed to block 718. For example, the information may specify the use of an encryption algorithm stored in the eSIM to perform the encryption/decryption. At block 718, the user device may perform the encryption/decryption at the eSIM using the encryption key stored in the eSIM.

Returning to decision block 710, if the information specifies using the encryption key stored in the trusted environment of the user device, the process 700 may proceed to block 720. At block 720, the user device may determine whether the information specifies using the eSIM or the user device for encryption/decryption. At decision block 722, if the user device determines that the information specifies the use of the user device, the process 700 may proceed to block 724. At block 724, the user device may perform the encryption/decryption at the user device using the encryption key stored in the trusted environment of the user device. Returning to decision block 722, if the user device determines that the information specifies the use of the eSIM, the process 700 may proceed to block 726. At block 726, the user device may perform the encryption/decryption at the eSIM using the encryption key stored in the trusted environment of the user device.

Returning to decision block 706, if the user device determines that the information deactivates the subscriber identifier information encryption/decryption, the process 700 may proceed to block 728. For example, the information may include a specific command for the user device to terminate subscriber identifier information encryption/decryption. At block 728, the user device may suspend performance of the subscriber identifier information encryption/decryption.

The distribution of the MNO-specific 5G functionality information for storage in the trusted environment offers several advantages. First, the distribution of the 5G functionality information for storage in the eSIM is carried out via the download of an update eSIM profile to the eSIM. However, in order to download the update eSIM profile of an MNO, the user device must be attached to the wireless carrier network of the MNO using an existing eSIM profile. This means that the distribution of the 5G functionality information for storage in the eSIM will fail if the user device is currently attached to the wireless carrier network of a different MNO. On the other hand, the distribution of 5G functionality information for storage in the trusted environment may be performed using third-party messaging services, such as Google Cloud Messaging (GCM), Apple Push Notification service (APNs), Windows Push Notification Service (WPNS), and/or so forth. Since these third-party messaging services are network-agnostic, the distribution of the 5G functionality information for storage in the trusted environment may be successfully performed irrespective of the wireless carrier network that is currently attached to by the user device.

Furthermore, as the use of Internet-of-Things (IoT) devices become more widespread, they are expected to constitute a great number of user devices served by 5G networks. In order to reduce manufacturing cost, IoT devices may be designed with minimal computing resources, e.g., processing power and memory, for executing eSIM functionalities. As such, distribution of the 5G functionality information for storage in a trusted environment, which is supported by the primary memory and processor of a user device, may offer performance gains on certain user devices.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform actions comprising:
   receiving a request from a mobile network operator (MNO) to provide MNO-specific 5G functionality information of the MNO to a user device; and
   directing a network-agnostic messaging service to deliver the MNO-specific 5G functionality information to the user device for storage in an MNO-specific memory area allocated for the MNO in a trusted environment of the user device when the user device is attached to an additional wireless carrier network of another MNO,
   wherein the MNO-specific 5G functionality information instructs the user device to use an encryption key stored in the trusted environment or an Embedded Subscriber Identity Module (eSIM) of the user device to encrypt or decrypt subscriber identifier information of the user device for 5G communications exchanged between the user device and a core network of a wireless carrier network operated by the MNO.

2. The one or more non-transitory computer-readable media of claim 1, wherein the actions further comprise directing the messaging service to send a command that instructs the user device to allocate an MNO-specific memory area in the trusted environment of the user device to store the MNO-specific 5G functionality information of the MNO.

3. The one or more non-transitory computer-readable media of claim 1, wherein the MNO-specific 5G functionality information further instructs the user device to encrypt or decrypt the subscriber identifier information using an encryption algorithm that is stored in the user device or in the eSIM of the user device.

4. The one or more non-transitory computer-readable media of claim 3, wherein encrypting or decrypting the subscriber identifier information using the encryption algorithm stored in the user device includes using a particular encryption algorithm stored in the trusted environment of the user device.

5. The one or more non-transitory computer-readable media of claim 1, wherein the subscriber identifier information includes an International Mobile Subscriber Identity (IMSI), and wherein encrypting the IMSI with the encryption key generates a Subscription Concealed Identifier (SUCI) for the 5G communications exchanged between the user device and the core network.

6. The one or more non-transitory computer-readable media of claim 1, wherein the subscriber identifier information includes a Mobile Station International Subscriber Directory Number (MSISDN), and wherein encrypting the MSISDN with the encryption key generates a Subscription Permanent Identifier (SUPI) for the 5G communications exchanged between the user device and the core network.

7. The one or more non-transitory computer-readable media of claim 1, wherein the actions further comprise directing the network-agnostic messaging service to deliver additional MNO-specific 5G functionality information to the user device for storage in the MNO-specific memory area that deactivates encryption and decryption of the subscriber identifier information.

8. The one or more non-transitory computer-readable media of claim 7, wherein the additional MNO-specific 5G functionality information revokes the encryption key to deactivate the encryption and the decryption of the subscriber identifier information.

9. The one or more non-transitory computer-readable media of claim 1, wherein the network-agnostic messaging service is one of Google Cloud Messaging (GCM), Apple Push Notification Service (APNs), or Windows Push Notification Service (WPNS).

10. The one or more non-transitory computer-readable media of claim 1, wherein the trusted environment of the user device is provided by at least one of dedicated memory or a dedicated processor of the user device that offers an isolated execution space for executing codes.

11. The one or more non-transitory computer-readable media of claim 1, wherein the actions further comprise, in response to the user device indicating that the MNO-specific 5G functionality information is stored in the MNO-specific memory area, notifying the MNO that the user device is provisioned with the MNO-specific 5G functionality information.

12. A computer-implemented method, comprising:
receiving a request from a mobile network operator (MNO) to provide MNO-specific 5G functionality information of the MNO to a user device;
storing the MNO-specific 5G functionality information in an Embedded Subscriber Identity Module (eSIM) profile that is associated with the MNO; and
directing a file transfer service of the MNO to send the eSIM profile to the eSIM of the user device,
wherein the MNO-specific 5G functionality information instructs the user device to use an encryption key stored in a user device or the eSIM of the user device to encrypt or decrypt subscriber identifier information of the user device for 5G communications exchanged between the user device and a core network of a wireless carrier network operated by the MNO.

13. The computer-implemented method of claim 12, wherein the eSIM profile is an update eSIM profile that replaces an existing eSIM profile stored in the eSIM profile of the user device.

14. The computer-implemented method of claim 12, wherein the file transfer service sends the eSIM profile that includes the MNO-specific 5G functionality information to the user device when the user device is attached to a wireless carrier network of the MNO.

15. The computer-implemented method of claim 12, wherein the MNO-specific 5G functionality information further instructs the user device to encrypt or decrypt the subscriber identifier information using an encryption algorithm that is stored in the user device or in the eSIM of the user device.

16. The computer-implemented method of claim 12, further comprising directing the file transfer service to deliver an additional eSIM profile to the eSIM of the user device, the additional eSIM profile including additional MNO-specific 5G functionality information that deactivates encryption and decryption of the subscriber identifier information.

17. A user device, comprising:
one or more processors; and
memory including a plurality of computer-executable components that are executable by the one or more processors to perform a plurality of acts, the plurality of acts comprising:
in response to receiving mobile network operator (MNO)-specific 5G functionality information of an MNO via an Embedded Subscriber Identity Module (eSIM) profile, storing the eSIM profile in an eSIM of the user device; and
in response to receiving the MNO-specific 5G functionality information of the MNO via an update package, storing the update package in a trusted environment of the user device,
wherein the MNO-specific 5G functionality information configures the user device to or instructs the user device to perform one or more operations related to using 5G telecommunication services provided by the MNO.

18. The user device of claim 17, wherein the one or more operations include encrypting or decrypting subscriber identifier information of the user device using an encryption algorithm that is stored in the user device or in the eSIM of the user device for 5G communications exchanged between the user device and a core network of a wireless carrier network operated by the MNO.

19. The user device of claim 17, wherein the one or more operations further include using an encryption key stored in the trusted environment or the eSIM of the user device to encrypt or decrypt subscriber identifier information.

20. The user device of claim 18, wherein the subscriber identifier information includes an International Mobile Subscriber Identity (IMSI) or a Mobile Station International Subscriber Directory Number (MSISDN).

* * * * *